UNITED STATES PATENT OFFICE.

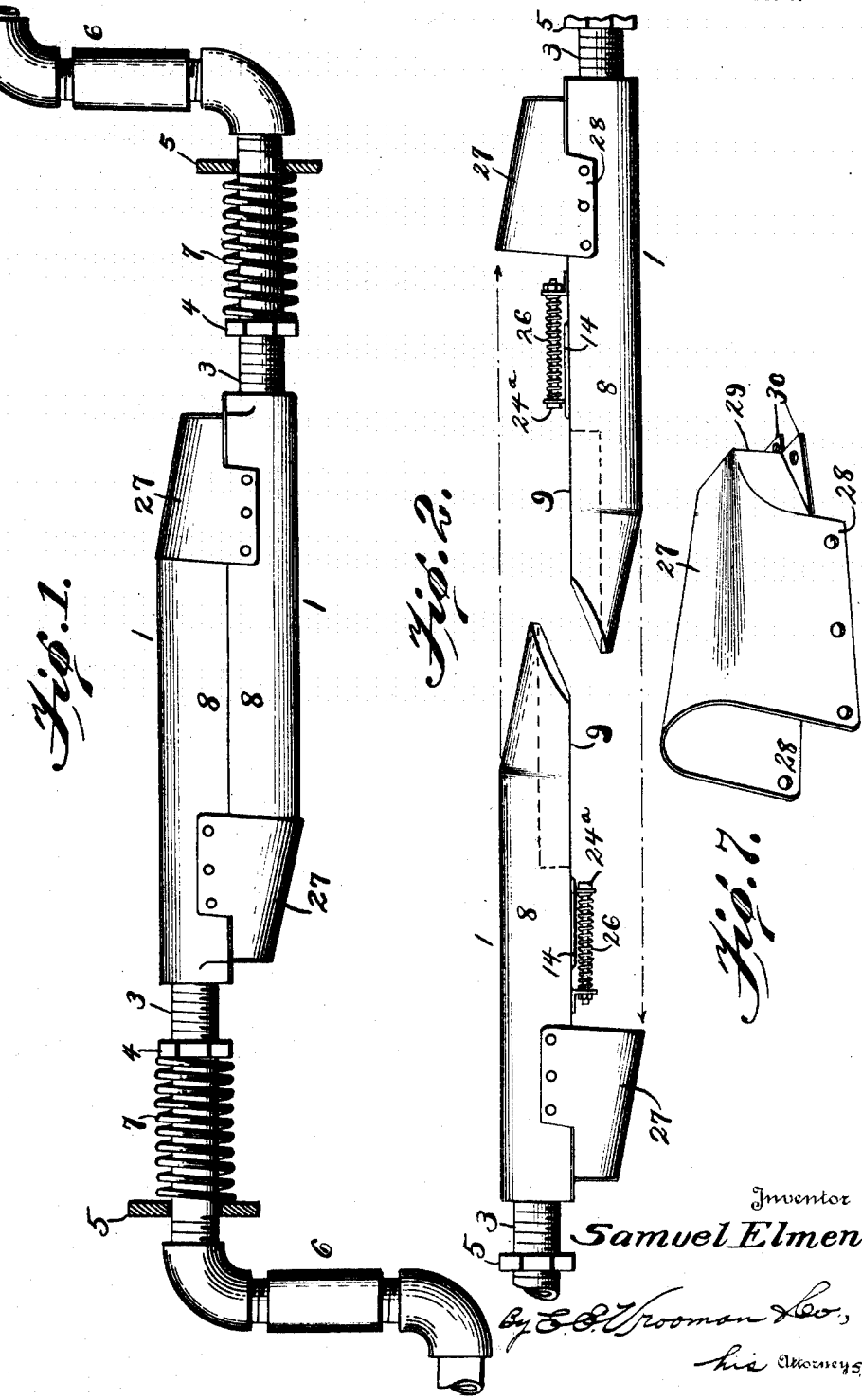

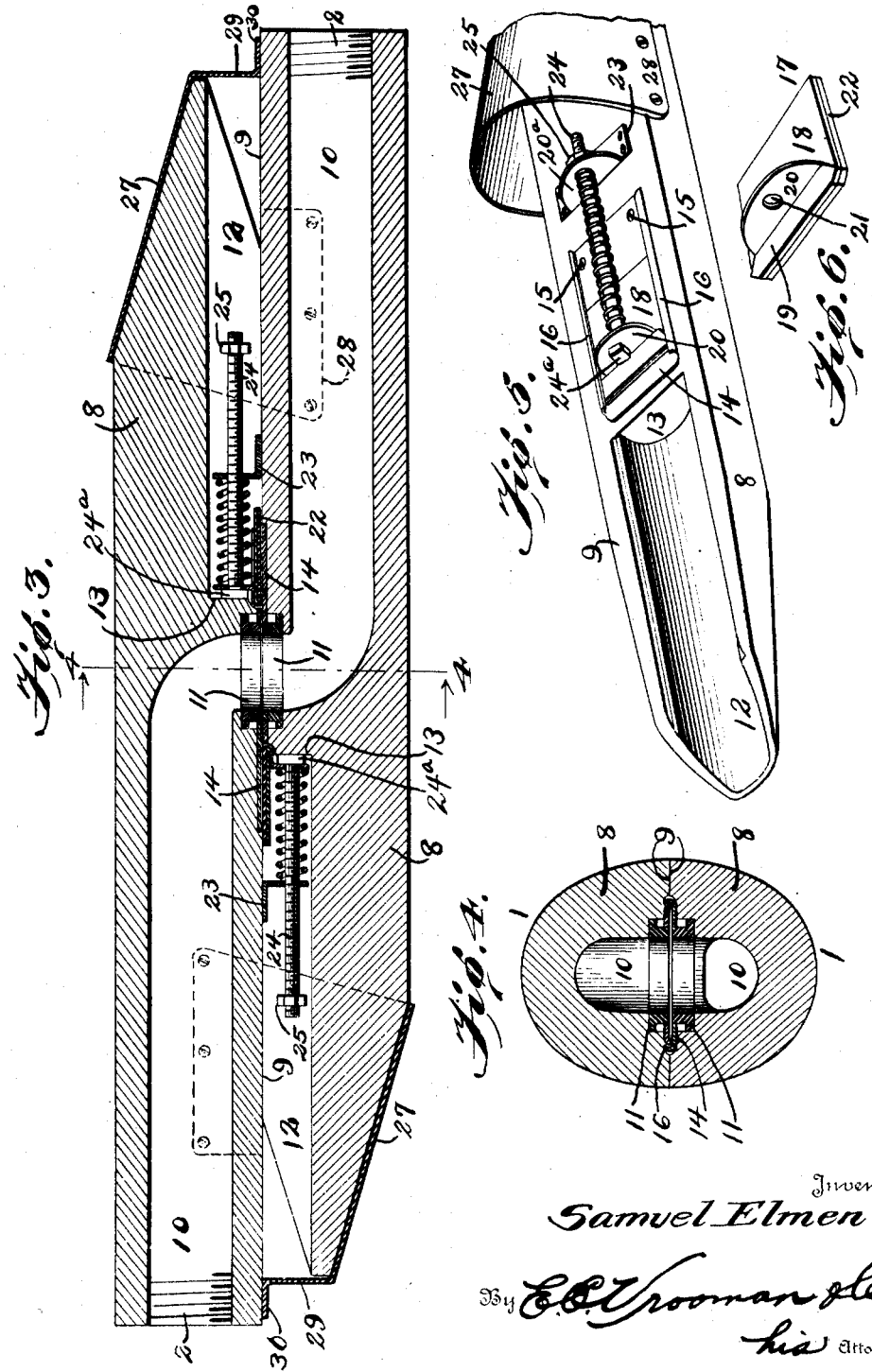

SAMUEL ELMEN, OF BUNDY, MONTANA.

AUTOMATIC AIR-BRAKE COUPLING.

1,365,776.  Specification of Letters Patent.  Patented Jan. 18, 1921.

Application filed February 14, 1920. Serial No. 358,620.

*To all whom it may concern:*

Be it known that SAMUEL ELMEN, a citizen of the United States, residing at Bundy, in the county of Musselshell and State of Montana, has invented certain new and useful Improvements in Automatic Air-Brake Couplings, of which the following is a specification, reference being had therein to the accompanying drawings.

This invention relates to an automatic air brake coupling, and it has for its object the construction of an efficient and comparatively simple apparatus whereby the air brake hose, or line, can be quickly and efficiently coupled for connecting the systems of two contiguous, or abutting, cars, and the like.

With this and other objects in view, my invention comprises certain novel constructions, arrangements and combinations of parts as will be hereinafter fully described, illustrated in the accompanying drawings, and more particularly pointed out in the appended claims.

In the drawings:

Figure 1 is a view in side elevation of an apparatus constructed in accordance with the present invention, showing the coupler sections together, while Fig. 2 is a similar view, showing the coupler sections separated.

Fig. 3 is a longitudinal sectional view of the coupler sections.

Fig. 4 is a sectional view taken on line 4—4, Fig. 1, and looking in the direction of the arrows.

Fig. 5 is a fragmentary perspective view of one of the coupler sections.

Fig. 6 is a perspective view of one of the shut-off valves.

Fig. 7 is a perspective view of one of the hoods.

Referring to the drawings by numerals, 1 designates the coupler sections. Into the threaded ends 2 (Fig. 3) are threaded pipes 3. These pipes 3 are provided with nuts 4, contiguous to the outer ends of the sections 1, and surrounding these pipes are supporting cross bars 5 carried by the platform or under structure of cars. The hose lines 6, of the cars, are connected to the outer end of the pipes 3, back of the cross bars 5 (Fig. 1). Coil springs 7 are placed between the cross bars 5 and the nuts 4, preferably around the pipes 3, so as to always have a tendency to push the coupler sections toward each other; these springs 7 also constitute a bumper or a cushion to take up considerable shock, as the coupler sections close together. The nuts 4 constitute tensioning means as by screwing the same upon the pipes 3 the tension of the springs can be controlled by either compressing the springs, when the nuts are screwed against the same or permitting the spring to expand, when the nuts are screwed toward the outer ends of the coupler sections.

The coupler sections 1 are similarly constructed and are interchangeable as to position and therefore, it will only be necessary to specifically describe one of the sections.

The coupler section comprises an elongated body 8, having a flat inner face 9 (Fig. 5). The body is provided with an air passage 10, communicating with the threaded end 2. At the inner end of the passage 10, and lying in a horizontal plane, is a rubber gasket 11; the outer edge of the gasket 11 is flush with the flat face 9 of the body. The body is provided with a pocket 12; the inner end of the pocket is closed by a vertical wall 13, while its outer end is open for the purpose hereinafter described.

Placed flat upon the inner face 9, over the gasket 11, is a guiding plate 14, which plate is secured in position by screws 15. This guiding plate is provided with inwardly-extending flanges 16, at its outer edges, and slidably mounted between these flanges 16 (Fig. 5) is a shut-off valve 17. This shut-off valve 17 comprises a plate 18 that has the end 19 bent back flat upon the plate, and this bent portion 19 terminates in an upwardly-extending flange 20, in which flange 20 is aperture 21. A rubber lining 22 is attached to the under face of plate 18, so as to produce a tight connection between the shut-off valve and the guiding plate 14. A bracket 23 is fastened to the face 9 of the body, back of the plate 14, and this bracket is provided with a vertical flange 20$^a$, similar to the flange 20. Extending through the flanges 20 and 20$^a$ is a bolt 24, on which is mounted nut 25. Positioned between the flanges 20 and 20$^a$, and placed on the bolt 24, is a coil spring 26, which spring causes the shut-off valve 17 to close over the gasket 11, closing the air passage 10, when the coupler sections 1 are separated, as shown in Fig. 2. However, as soon as the coupler sections are brought together, the inner headed ends 24$^a$ of the bolts 24 strike against the vertical walls 13 of the coupler sections, causing the shut-off valves to be drawn or forced backward, opening the air passages, as clearly shown in Fig. 3; it is to be noted that the shut-off valves and their associated parts move into the pockets 12, by reason of their outer ends being open as the two sections close together, and likewise move out of the pockets as the two sections are separated.

To assist in guiding the sections into their closed or coöperating position (Figs. 1 and 3), and to cover the outer ends of the sections, I provide guiding hoods 27. Each hood 27 has its lower side-edges 28 fastened to the sides of the body 8 and its outer end 29 is closed, terminating in right angled, horizontal flanges 30, which flanges are fastened to the flat face 9 of the section.

While I have described the preferred embodiment of my invention and have illustrated the same in the accompanying drawings, certain minor changes or alterations may appear to one skilled in the art to which this invention relates, during the extensive manufacture of the same, and I, therefore, reserve the right to make such alterations or changes as shall fairly fall within the scope of the appended claims.

What I claim is:

1. In an apparatus of the class described, the combination with pipes, of coupler sections carried by said pipes, each section comprising an elongated body having an air passage communicating with a pipe, said body provided at one end with an open-ended pocket, said pocket having a straight vertical wall at its inner end, a rubber gasket flush with the inner face of the body and positioned at the inner end of the air passage, a guiding plate provided with flanged side-edges positioned over the gasket, said plate provided with an opening registering with the gasket and the air passage, a shut-off valve on said plate between its flanged side-edges for closing said opening, said shut-off valve comprising a plate having one end bent over flat upon the plate and terminating in a vertical flange, a rubber lining on the inner face of the plate of the shut-off valve, a bracket provided with a flange fastened on the body behind the guiding plate, a bolt provided with a head at its inner end extending through the flange of the shut-off valve and the flanges of the bracket, a spring on the bolt between the flanges, and the heads of the bolts engaging the vertical walls at the inner ends of the pockets of the sections for opening and retaining the shut-off valves in an open position while the sections are closed together for permitting free passage of air through the air passages of the sections and the pipes.

2. In an apparatus of the class described, the combination with supports, of coupler sections carried by said supports, said sections provided with communicating air passages, when the sections are closed together, each section provided with a valve device for closing the air passage therein when the sections are separated, said valve device comprising a plate provided with guiding flanges, a slidable shut-off valve between said flanges, said shut-off valve provided with a flange, a bracket provided with a flange carried by the body contiguous to the plate, a bolt supported upon the flange of the shut-off valve and the flange of the bracket, and a spring on said bolt between said flanges for normally retaining the shut-off valve in a closed position upon the plate for closing the inner end of the air passage in the body.

3. In an apparatus of the class described, the combination with supports, of coupler sections carried by said supports, each coupler section comprising a body provided with an air passage in one end and extending substantially to the middle of the body, said body provided with a flat inner face, the air passage opening upon said flat inner face, a rubber gasket counter-sunk in the body at the inner end of the air passage and having its outer end flush with the inner face of the body, said body provided with an open-ended pocket at one end and contiguous to the inner end of the air passage, slidable valve means over the gaskets and the inner ends of the air passages of the bodies, portions of the slidable valve means extending into the pockets and bearing against the inner ends of said pockets for retaining the valve means in an open position for allowing free communication from one air passage to the other of the bodies, and said portions of the valve means adapted to move out of the pockets through the open ends of said pockets when the coupler sections are separated or moved apart.

In testimony whereof I hereunto affix my signature.

SAMUEL ELMEN.